US007001118B1

(12) United States Patent  
Weinstein et al.

(10) Patent No.: US 7,001,118 B1
(45) Date of Patent: Feb. 21, 2006

(54) DOWEL JIG

(75) Inventors: Burton Weinstein, New York, NY (US); Richard H. Deaton, New York, NY (US)

(73) Assignee: Simp'l Products, INC, Mount Vernon, NY (US)

( * ) Notice: Subject to any disclaimer, the term of this patent is extended or adjusted under 35 U.S.C. 154(b) by 197 days.

(21) Appl. No.: 10/757,614

(22) Filed: Jan. 13, 2004

(51) Int. Cl.
*B23B 39/00* (2006.01)
*B23B 47/00* (2006.01)

(52) U.S. Cl. .................................. 408/103; 408/115 R

(58) Field of Classification Search .................. 408/97, 408/103, 115 R, 241 B
See application file for complete search history.

(56) References Cited

U.S. PATENT DOCUMENTS

| | | | | | |
|---|---|---|---|---|---|
| 4,060,333 | A | * | 11/1977 | White | 408/103 |
| 4,257,166 | A | * | 3/1981 | Barker et al. | 408/241 G |
| 4,730,959 | A | * | 3/1988 | Aerni et al. | 408/115 R |
| 4,952,101 | A | * | 8/1990 | Coombs | 408/115 R |
| 5,407,307 | A | * | 4/1995 | Park | 408/115 R |
| 5,507,607 | A | * | 4/1996 | Ericksen et al. | 408/108 |
| 5,807,033 | A | * | 9/1998 | Benway | 408/1 R |
| 5,947,652 | A | * | 9/1999 | Wagner | 408/1 R |
| 6,244,794 | B1 | * | 6/2001 | Lindsay | 408/103 |
| 6,283,685 | B1 | * | 9/2001 | Lemieux | 408/115 R |

OTHER PUBLICATIONS

DOW'L SIMP'L KIT Instructions from back of package 1 page 2003.
DOW"L SIMP'L Instruction pages 2 pages 2003.

* cited by examiner

*Primary Examiner*—Bena Miller
(74) *Attorney, Agent, or Firm*—Gordon D. Coplein

(57) ABSTRACT

A dowel jig for making holes in a member such as a board to accept dowels for projecting toward corresponding holes for receiving the dowels to make butt, end and T type dowel joints for two members. The jig has a base having an internal planar area and at least one hole transversely through the planar area and a transverse leg at each end of the base. A foot is at the outer corner junction of each base end and transverse leg and the lower surfaces of both feet lie in a common plane that is parallel to the base internal planar area so that when the lower surfaces of the feet are placed on the flat upper surface of a member the base hole will be transverse to the flat surface to permit aligned passage of a drill bit to drill a hole in the member transverse to the flat surface. Notches are provided in each of the feet along a line that passes through the hole center to hold a rod in which a hole is drilled. One of the legs also has an internal planar area transverse to the base internal planar area with one or more holes and when the jig is clamped to a member holes can be drilled in an edge of the member using the base holes as guides and in the member upper surface near a member edge using the leg holes as guides.

12 Claims, 6 Drawing Sheets

DOWEL JIG

FIELD OF THE INVENTION

This invention is directed to a jig for making holes for d dowels to form different types of joints for two boards, including T-joints.

BACKGROUND OF THE INVENTION

In the field of woodworking it is well-known to join two pieces of wood together by the use of dowels. FIG. 1A shows one form of joining together two pieces of wood end to end. Here, a plurality of dowels 10 in spaced apart dowel accepting holes 11 on the end edge of a first board A are to be received in corresponding dowel receiving holes 12 in the end edge of a second board B. This is often called a butt type joint. FIG. 1B shows a corner joint in which the two pieces of wood A and B are joined together in transverse (perpendicular) relationship at an end edge of the first board A that has the dowels 10 in the accepting holes 11. The dowel receiving holes 12 are in the main surface at the end of second board B. FIG. 1C shows a T joint in which spaced dowels 10 in the end edge of the first board A are to be located in the dowel receiving holes 12 in an intermediate point of the second board B away from an edge.

In each case in FIGS. 1A–1C, the holes 11 are drilled in the board to accept the dowels 10 and hold them with wood glue. Usually, wood glue also is placed in the dowel receiving holes 12 and after the dowels 10 are placed in the receiving holes 12 the two pieces of wood A and B are clamped together until the glue sets.

In order to assure a proper joint in each of FIGS. 1A–1C, the holes 11 in which the dowels 10 are accepted in the first board A and the dowel receiving holes 12 in the second board B must be precisely located and at a right angle (transverse to) the plane of the surface in which they are drilled. Often times a jig is used to accomplish this. In commercial machines used for woodworking purposes, such jigs are well known. However, a need exists for people who practice woodworking on a limited basis or as a hobby to have an inexpensive jig which can accomplish the task of precisely drilling the holes 11 and 12 in a simple manner.

FIGS. 2A and 2B show a prior art type of dowel jig 20 sold by SIMP'L PRODUCTS, INC of Mount Vernon, N.Y. as part of a kit called DOW'L SIMP'L KIT. The jig 20 is of a general C shape and is an aluminum extrusion. Jig 20 includes a base 24 with an upper leg 26 and a lower leg 28 each being generally transverse to the base 24. A thumbscrew 30 is threaded through a hole 31 in the lower leg 28 and has a circular plate 32 at its upper end which is to press against a surface of the piece of wood to which the jig 20 is to be fastened.

A set of spaced parallel raised ribs 27 extend across the width of the inner surface of the upper part of base 24 near the upper leg 26. The ribs 27 are also generally transverse to the longitudinal axis of the base. A similar set of spaced parallel raised ribs 29 extend across the width of inner surface of the upper leg 26 and are generally transverse to the length of the leg. While three ribs are shown for each of the rib sets 27 and 29, it should be understood that there can be any number, preferably as long as there are more than two. The innermost end surface of the ribs in each of the set 27 lie in a first plane and those of the ribs of set 29 lie in a second plane that is transverse to the first plane. The innermost ends of the ribs 27 and 29 can be either curved or flat. Essentially, the innermost ends of each set of ribs 27 and 29 establishes a respective planar area for the interior of the base and upper leg with the two planar areas being transverse to each other. The planar areas could be made by the inner surfaces of the base and upper leg, but possibly could require machining, which is desirably avoided.

As shown more clearly in FIG. 2B, a group of threaded through holes 34-1, 34-2 and 34-3 is formed in the base leg 24 in the planar area established by the innermost ends of the set of raised ribs 27 and transverse to this planar area. A similar group of threaded through holes 36-1, 36-2 and 36-3 is formed in the upper leg 26 in the planar area formed by the inner ends of the set of ribs 29 and transverse to this area. The holes 34 and 36 in the base 24 and upper leg 26 are internally threaded and of the same diameter. The centers of the group of holes 34 lie along a line that is skewed at a slight angle to a line that would be transverse to the longitudinal axis of the base 24. The holes 36 in the upper leg 26 also are of the same diameter and have centers that lie along a line that skewed at a slight angle to a line that would be transverse to the longitudinal axis of the upper leg 26. The reason for the skewing is described below.

A flange lip 33 is formed at the free end of the upper leg 26. The lower surface of this lip is the same plane as the planar area formed by the innermost point of each of the raised ribs of the set 29. The flange lip 33 has a plurality of V-shaped cutouts, or index openings, 39-1, 39-2 and 39-3 with the apex of each cut out 39 being in line with the center of the corresponding upper leg hole 36-1, 36-2 and 36-3. An extension of a line from the apex of each index 39 also passes through the corresponding hole 34 in the jig base 24.

As shown in FIG. 2B, in using the jig 20 it is placed on a board in which a hole 11 or 12 is to be drilled with the innermost ends of the set of raised ribs 29 and the lower surface of lip 33 of the upper leg 26 resting on the board main surface of the board. The innermost ends of the set of raised ribs 27 of the base 24 are placed against the edge of the board. The board edge can be at the end or along the board length, and the set of holes 34 face this edge. As is known, most commercial lumber boards are of uniform thickness, such as ⅝", ¾" and 1". The skewed alignment of the holes 34 in the base 24 is such that each one will be at the center of the edge of a board of a particular thickness. For example, with the lip 33 and ribs 29 resting of the board flat surface, the hole 34-1 will be at the center of a ⅝" thick board, the hole 34-2 at the center of a ¾" thick board and the hole 34-3 at the center of a 1" thick board.

When holes 11 (and 12) are to be made in the edge of a board, the center point for each hole is marked. A plurality of dowels 10 of the same diameter usually are used so that the holes 11 and 12 to be drilled in the boards also would have this diameter. The jig is positioned with the center of the appropriate size hole 34 corresponding to the board thickness over a mark. The jig is positioned so that the innermost end of the base leg ribs 27 engage the board edge. This will position the selected hole jig base hole 34 directly facing at 90° to the board edge. The thumbscrew 30 is turned to securely fastened the jig to the board in this position.

A bushing 50 that has a threaded neck is threaded into the selected hole 34. The bushing 50 has a central hole 51 that will accommodate a drill bit D having a diameter of the hole to be drilled in the board. The bushing hole 51 will be transverse to the board edge because the innermost ends of the set of leg ribs 27 rest against the board edge. The prior art jig kit is supplied with a set of bushings having different diameter holes 51 to accept and guide different diameter drill bits. This permits different diameter holes to be drilled and different diameter dowels to be used. While the hole 34 and 36 and the bushing neck are shown as being threaded, this is not necessary as long as a tight fit of the bushing neck in the hole is obtained.

The drill bit D passes through the bushing guide hole 51 and into the edge of the board. The bushing 50 acts as a guide to make certain that the holes 11 (or 12) drilled in the board edge will be at 90° to the edge. As drilling takes place, the spaces between the set of raised ribs 27 provides exit passages for the wood chips produced by the drilling operations. The described process of centering the hole 34 over a mark and drilling is repeated until the desired number of holes are made in the edge of the board. By drilling holes in the end edge of each of two boards that are to be butt joined as shown in FIG. 1A, the holes 11 in which the dowels 10 are accepted and the dowel receiving holes 12 will be at 90° to the edge of each board and be precisely aligned so that a firm joint is made.

To make an end joint as shown in FIG. 1B, marks are made for the centers of the holes 11 to be drilled in the edge of one board A and the holes are made 90° to the board end edge as described above. Correspondingly located marks are made of the top surface of the board B where the dowel receiving holes 12 are to be drilled. The center of the appropriate upper leg hole 36 that is of the same size as the diameter of the dowel 10 in the receiving hole 11 in the edge of board A is positioned over the mark. The thumbscrew is turned to fasten the jig to the board. The appropriate size bushing 50 is threaded into this hole 34 and the hole in the board is then made by the drill bit D. The hole in the board top surface will be at 90° to the board top surface because the bushing hole 51 is transverse to the plane in which the lip 33 lower surface and the planar area defined by the innermost end of ribs 26 lie. This procedure is repeated to make the number of holes 12 needed to accept the dowels 10 in board A.

It should be understood that for the dowel joints to be properly made, that each hole 11 and 12 must be precisely transverse to the surface of the board in which it is made. The jig 20 of FIG. 2 cannot readily be used to make a T joint of the type show in FIG. 1C where holes must be drilled at an intermediate point of the board upper surface that is not accessible to the jig upper leg holes 36 with the jig positioned as shown in FIG. 2. Laying the outer surface of jig base 24 on the board surface so that a hole can be drilled using one of the base holes 34 is not a solution because the base outer surface often is curved as shown in FIG. 2A. If this curved surface is placed on the upper surface of the board B in which holes are to be drilled, then the jig base holes 34 will not be exactly transverse to the plane of the board upper surface.

Accordingly, a need exists for a simple and inexpensive jig that can be used to accurately makes the holes necessary for a dowel T joint. It is preferred that this jig also be capable of making the holes needed for dowel butt and end joints.

BRIEF DESCRIPTION OF THE INVENTION

In accordance with the invention a dowel jig is provided that is of a generally C shape having a base and upper and lower legs. A set of holes is provided in each of the base and upper legs into which a bushing is placed. The jig preferably has a thumbscrew so that it can be fastened to a board and dowel accepting and receiving holes can be drilled on the edge of a board and the board upper surface near an edge as described above. The jig of the invention also has an outwardly extending flange foot on the outer corner of the junction of each of the upper and lower legs to the respective ends of the base. The lower surface of each of the feet are spaced from the jig base outer surface and lie in a plane that is transverse to the centers of the holes in the base.

In using the jig to make the holes for a T joint in the top surface of one board, the feet lower surfaces are placed on the top surface of the board and the base hole is positioned over the point of the board where a hole is to be drilled. A bushing is placed into this hole. The feet make the bushing hole transverse to the board surface so that the hole drilled in the board will be precisely transverse to the board upper surface. This overcomes the problem of off-angle drilling that would occur if the curved outer surface of the base is placed on the board top surface.

In a further embodiment of the invention, a notch is made in each of the feet along a line through the center of a jig base hole, preferably the on used to drill the hole in the board top surface. A rod or stick is laid in the notches and a hole drilled in it by a drill bit that passes through a bushing in the base hole. The notches preferably of a V shape with the apex of each V lying on the line passing through the base hole to provide an index for placing the center of the jig base hole on a line drawn on the board.

BRIEF DESCRIPTION OF THE DRAWINGS

Other objects and advantages of the presence invention will become more apparent upon reference to the following specification and annexed drawings, in which.

DETAILED DESCRIPTION OF THE INVENTION

Figure 1A:
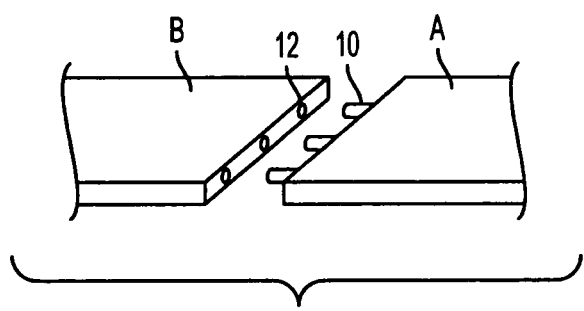
FIGS. 1A–1C are perspective views showing different types of dowel joints.
Figure 1B:
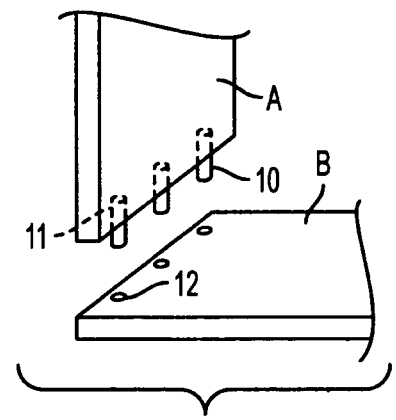
Figure 1C:
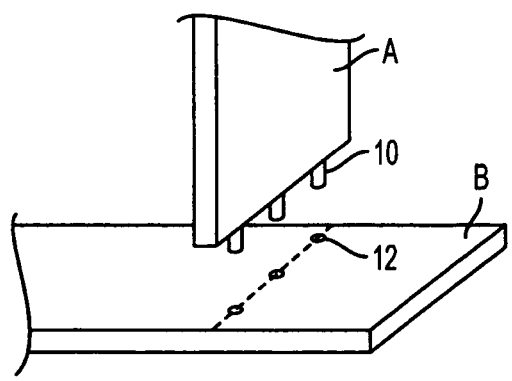
Figure 2A:
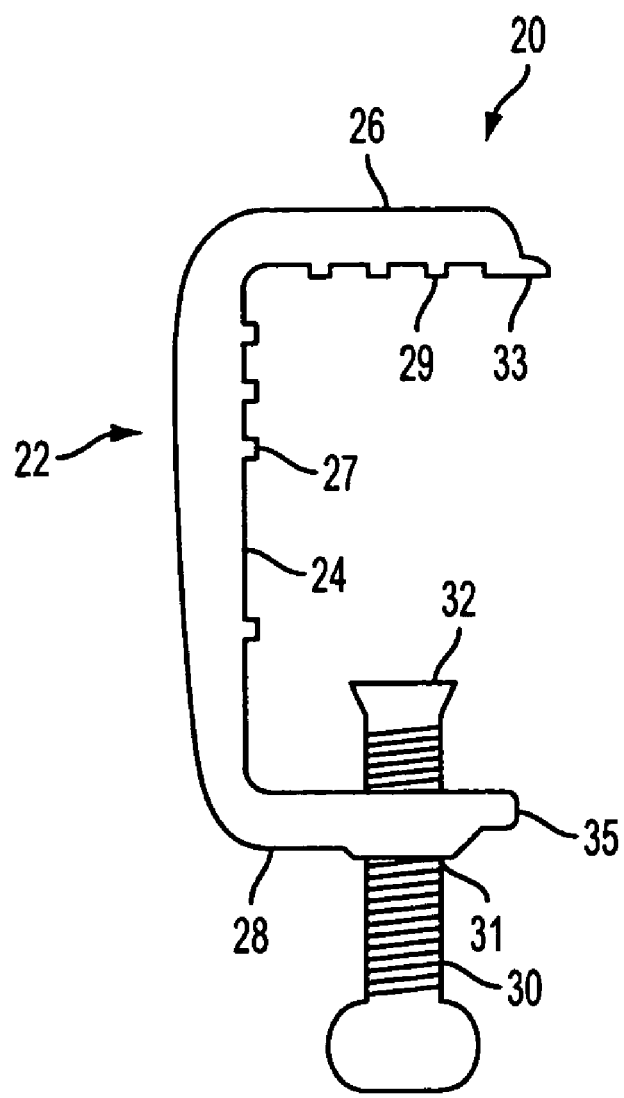
FIG. 2A is a side elevational view of a prior art type of jig and FIG. 2B is a perspective view of this jig in use.
Figure 2B:
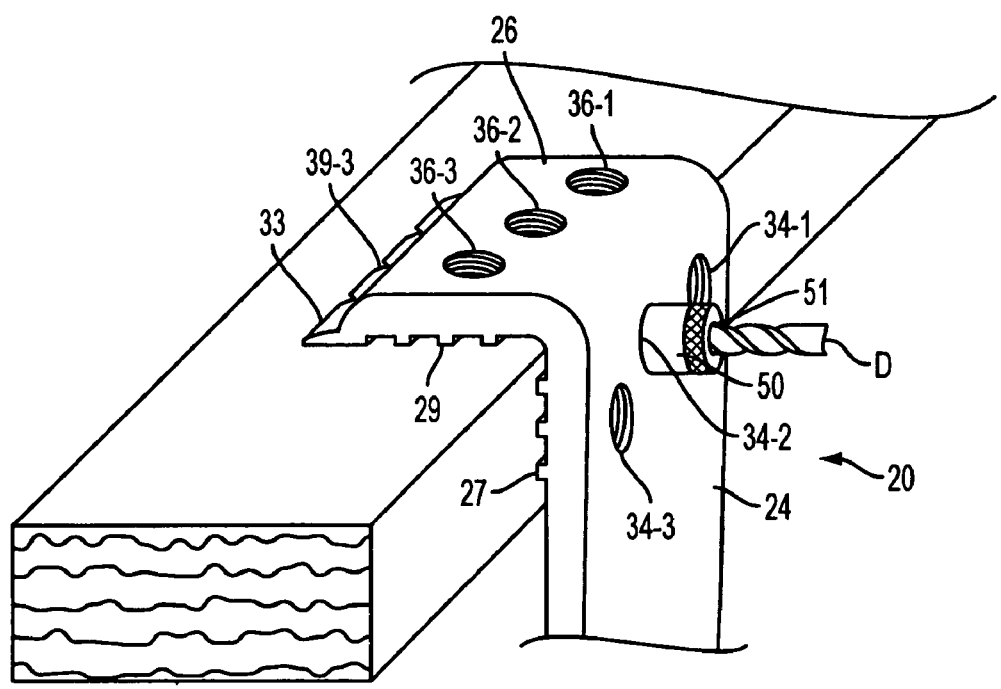
Figure 3A:
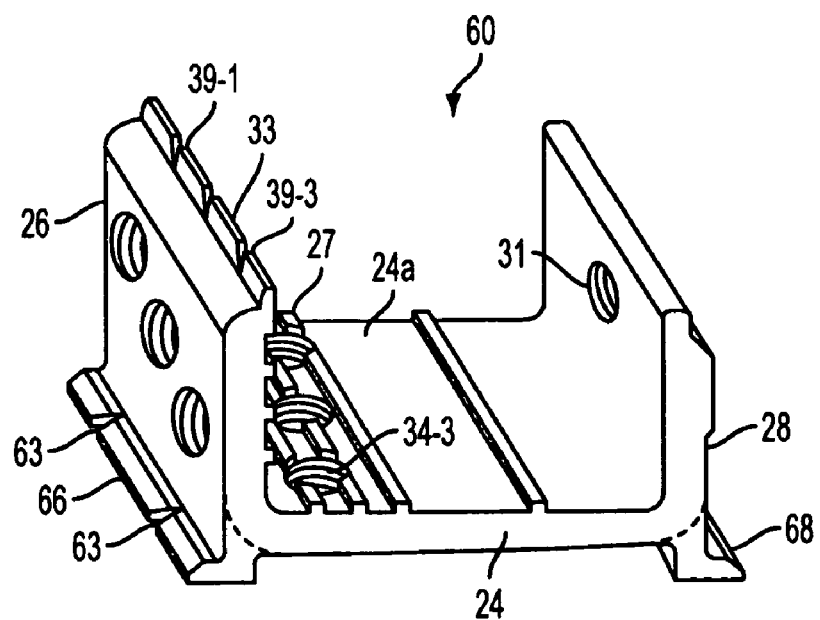
FIG. 3A is a perspective view of the jig of the invention.
Figure 3B:
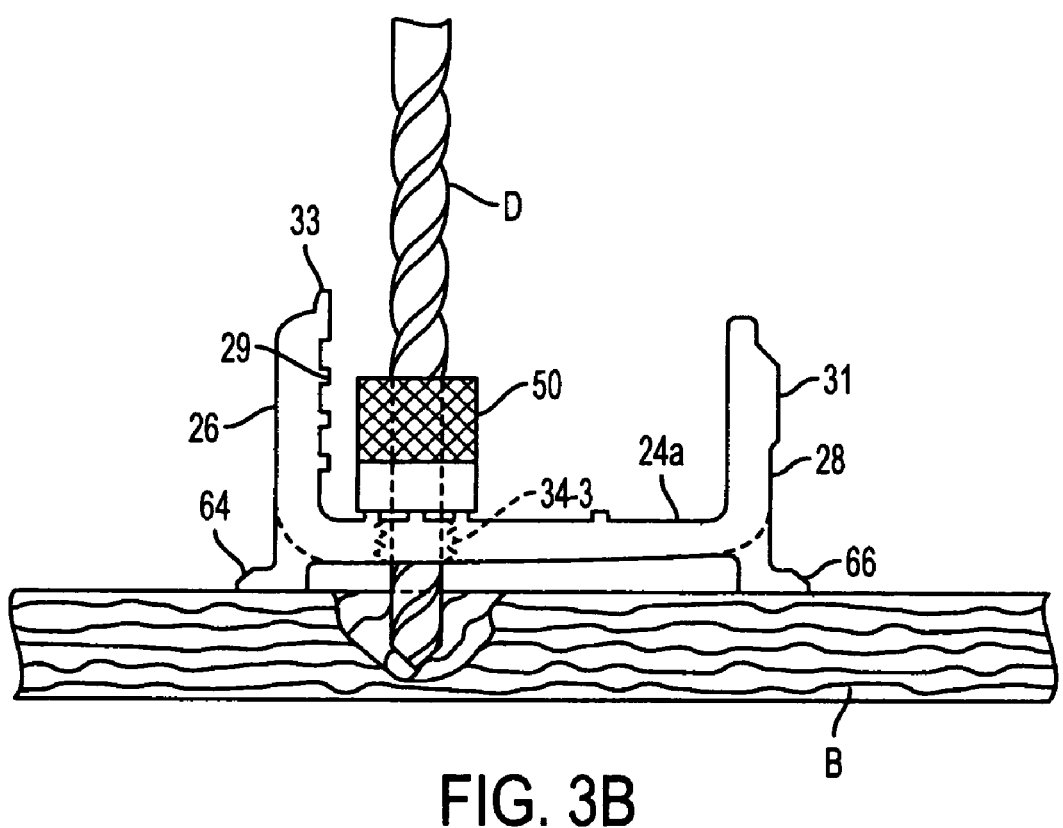
FIG. 3B is an end elevational view of this jig in use.

The jig 60 of the invention is described referring to FIGS. 3A–3B in which the same reference numerals are used for previously described elements of the prior art jig 20. The jig 60 can be used to perform all of the functions of the previously described jig 20. The thumbscrew 30 is not shown to simplify the description but it can be used with the jig 60 to make the butt and end joints of FIGS. 1A and 1B. Additionally, the jig 60 can make holes for the dowel T joint of FIG. 1C. Jig 60 also is preferably made of an aluminum extrusion.

In the jig 60 a flange foot 66 is formed at the outer junction of the base 24 and upper leg 26 and a similar flange foot 68 is formed at the outer junction of the base 24 and lower leg 28. Each of the feet 66 and 68 extends across the width of the base 24 and has a lower surface lying in a plane that is parallel to the planar area in which the innermost ends of the ribs 27 lie. The feet 66 and 68 extend outwardly of the respective leg 26 and 28 to which they are attached. The feet 66 and 68 also extend below and are spaced away from the outer surface of the base 24.

With this structure, when the feet 66 and 68 are placed on the flat surface of a board, the jig base holes 34 will be transverse to the board upper surface. In using jig 60 to drill a hole in the board upper surface, one of the base holes 34 is positioned over a mark on the board upper surface. This preferably is hole 34-3, which is the one furthest from the inner surface of the upper leg. This provides more room for the bushing 50 to be threaded into the hole and for the drill chuck (not shown) and drill bit D to have access to the jig interior. V-shaped index notches 63 are provided on the feet 66 and 68 to aligned the center of base hole 34-3 on a line that can be made on the board surface. As seen in FIG. 3B, the bushing 50 rests on the ribs 27. Since there is at least one rib 27 on each side of the hole 24, the bottom of the bushing has a flat plane mounting that is parallel to the board top surface. Therefore, as the drill bit D is guided by the bushing in drilling the hole 11 or 12, the hole drilled will be transverse to the board top surface. The space between the outer surface of the base 24 and the board surface provides an exit passage for the wood chips as the drilling takes place.

Figure 3C:
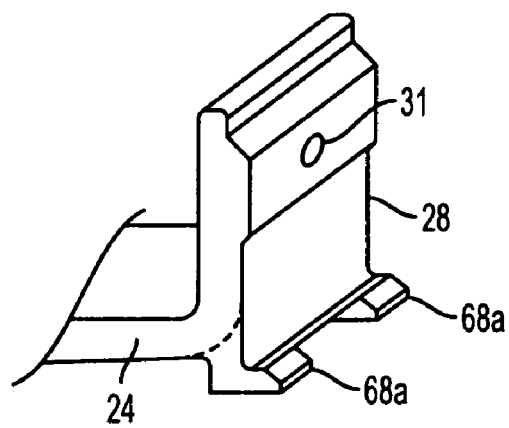
FIG. 3C is a partial view of a modified structure for the feet.

FIG. 3C shows a modification of the feet 66 and 68. Here, instead of the feet extending across the width of the base 24, they are located at each of the four corners of the jig base. Two of the feet 68a are shown at the outer corners of the junction of the base 24 and lower leg 28 and there would be two similar feet at the junction of the base and upper leg 26. The embodiment of FIGS. 3A and 3B with the continuous feet is preferred since it can be made of a one piece extrusion and does not require machining to produce the separate feet at the four corners.

Figure 4:
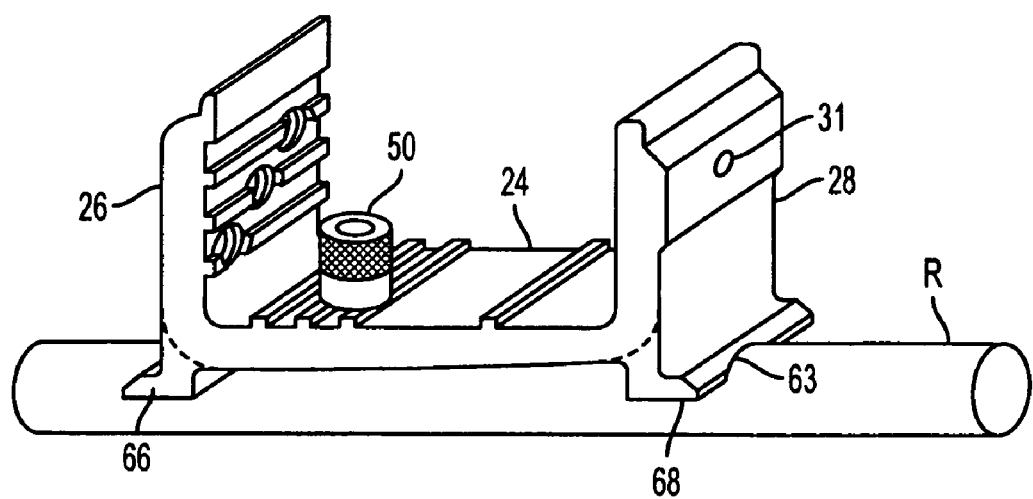
FIG. 4 is a perspective view of another embodiment of the jig that is used for drilling holes in a rod or shtick.

FIG. 4 shows a further embodiment of the invention that is used to drill holes in rods or dowel sticks. Here, a notch 73 is made in each of the feet 66 and 68 with the notch center lying along a line that passes through the center of one of the base holes, preferably the hole 34-3 for the reasons previously described. A rod or dowel stick R is placed in the notches and it will be centered below the hole 34-3. The height of space between the base 34 outer surface permits the rod to be held and depending upon the height of the space and rod diameter the rod will engage this surface. A drill bit guided through the bushing 50 will drill a hole in the center of the rod R. It is preferred that the notches 73 be of V shape with the apex lying on the center line so that the indexing function of the notches is preserved. Referring back to FIG. 3C, a rod or small piece of wood can be placed in the space between the pairs of feet at the outer corners at each end of the base 24 and a hole drilled in it as previously described.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A dowel jig comprising;
   a base having an internal planar area and at least one hole transversely through said planar area;
   a leg at each end of said base extending generally transverse to said base;
   a foot at the outer corner junction of each said base end and each said leg, the lower surfaces of both said feet lying in a common plane that is parallel to said base internal planar area, wherein upon said lower surfaces of said feet being placed on a flat surface of a member said at least one hole will be transverse to the member flat surface.

2. A dowel jig as claimed in claim 1 wherein said feet extend below and are spaced away from the outer surface of said base, wherein said base outer surface will be spaced from the member flat surface.

3. A dowel jig as claimed in claim 1 further comprising a bushing having a through hole to fit in a said at least one base hole with said bushing through hole being transverse to said base internal planar area, wherein a drill bit guided in said bushing through hole will drill a hole in the member that is transverse to the member flat surface on which said feet are placed.

4. A dowel jig as claimed in claim 1 further comprising a set of raised ribs extending on the interior surface of said base with there being at least one rib on each side of said at least one hole, the innermost end of each said rib of said set lying in the same plane to establish said base internal planar area.

5. A dowel jig as claimed in claim 4 further comprising a bushing having a through hole to rest on the innermost ends of said set of ribs on the interior surface of said base over a said at least one base hole with said bushing through hole being transverse to said base internal planar area established by the innermost ends of said set of base ribs, wherein a drill bit guided in said bushing through hole will drill a hole in the member that is transverse to the member flat surface on which said feet are placed.

6. A dowel jig as claimed in claim 2 further comprising a notch on each of said feet with the center of said notches lying along a line that passes through the center of one of said at least one base holes, wherein a rod laid in said notches will be centered under said one base hole.

7. A dowel jig as claimed in claim 1 further comprising an internal planar area on one of said legs that is transverse to said base internal planar area, and at least one hole transversely through said one leg at its internal planar area.

8. A dowel jig as claimed in claim 7 and further comprising a screw threaded clamp in the other said leg to clamp the jig to a member with said base internal planar area and said at least base one hole facing an edge of the member whereby a hole can be made transverse to the edge of the member, and the internal planar area of said one leg and said at least one hole of said one leg facing the member upper surface near the member edge whereby a hole can be made in the member upper surface transverse to the upper surface.

9. A dowel jig as claimed in claim 7 and further comprising a respective set of ribs on the interior surface of each of said base and said one leg, the innermost ends of said set of ribs of said base establishing said base internal planar area and the innermost ends of said one leg set of ribs establishing said one leg internal planar area, said base set of ribs to be positioned against the edge of the member and said one leg set of ribs to rest on the member upper surface.

10. A dowel jig as claimed in claim 9 further comprising a screw threaded clamp in said other said leg to clamp the jig to a member with said internal planar area of said one leg and at least one hole facing a surface of the member near the member edge and said base internal planar area and at least one hole facing the edge of the member whereby a hole can be made in the member transverse to the surface and a hole can be made in the member edge transverse to the member edge.

11. A dowel jig as claimed in claim 1 wherein each said foot extends substantially across the width of said base.

12. A dowel jig as claimed in claim 1 wherein each said foot comprises separate feet at each of the four outer corners at the junctions of said base and said legs.

\* \* \* \* \*